Figure 1:
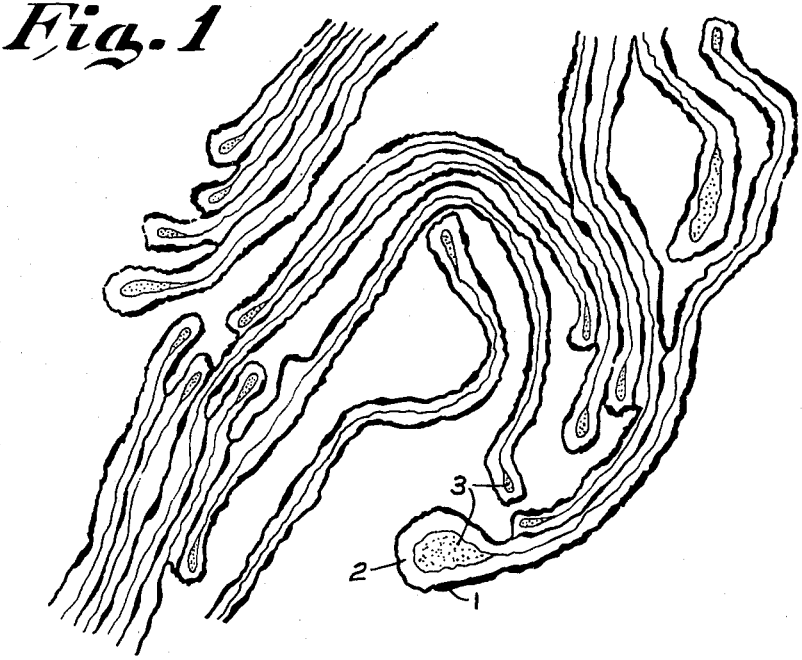

May 3, 1960

E. E. MAGAT 2,935,371

PROCESS FOR INTERFACIAL SPINNING IN WHICH ONE
PHASE CONTAINS A THICKENING AGENT

Filed May 5, 1954

INVENTOR
EUGENE EDWARD MAGAT

BY
ATTORNEY

United States Patent Office 2,935,371
Patented May 3, 1960

2,935,371

PROCESS FOR INTERFACIAL SPINNING IN WHICH ONE PHASE CONTAINS A THICKENING AGENT

Eugene E. Magat, Wilmington, Del., assignor to E. I. du Pont de Nemours and Company, Wilmington, Del., a corporation of Delaware Application May 5, 1954, Serial No. 427,879

10 Claims. (Cl. 18—54)

This invention relates to formation of polymeric structures by interfacial reaction, being concerned particularly with improvement in interfacial processes for production of articles shaped as filaments, films, and the like.

Early processes of forming shaped polymeric articles consisted of at least two comparatively unrelated steps: producing the polymers and then shaping them. Direct preparation of filaments and films has now been accomplished by conducting the polymerization reaction at an interface between phases containing the polymeric reactants and withdrawing the polymer immediately in the desired shape from the interface. The interfacial procedure may be characterized as bringing a liquid phase containing one reactant, which may be suitable for a condensation polymerization (e.g., a liquid organic diamine) into contact with a liquid phase containing a coacting polymer-forming reactant (e.g., a solution of an organic dicarboxylic acid halide) to form a liquid-liquid interface, controlling the shape of the interface until a polymeric structure has formed there, and then withdrawing the resulting article from the interface. In this way, a self-supporting filament or film may be produced continuously. Under favorable conditions the product may be quite strong structurally.

Preparation of shaped polymeric articles by technique of interfacial reaction has many advantages, one of which is rapidity of polymerization at ordinary or room temperature. Procedures for attaining this and related objectives are described in copending patent applications of Magat and Strachan (Serial No. 226,066, filed May 12, 1951, now Patent No. 2,708,617 and Serial No. 397,149, filed December 9, 1953, now Patent No. 2,798,-283) and Houtz (Serial No. 278,373, filed March 25, 1952). Subject matter of the present invention directed toward improvements in the mentioned interfacial processes is described also in the second of the above patent applications.

The reaction may be considered to involve at least one donor and at least one acceptor of active hydrogen, which itself either is retained as part of the polymer molecule or is split out in combination with part of the acceptor (i.e., condensed) to leave the polymer molecule made up of the remaining parts of both reactants. Whether donor or acceptor, a reactant should be polyfunctional (i.e., at least difunctional) with respect to this capability. Among notable reactants are the diamines. Illustrative of acceptor substances that react well with diamines (or with polyamines generally) in the described direct formation of shaped polymeric articles are the following substances (assumed polyfunctional): carboxylic acid halides, carboxylic acid phosphoric anhydrides, isocyanates, isothiocyanates, phosgene, azlactones, mixed anhydrides of carboxylic acids with trifluoroacetic acid, chloroformates, sulfonic acid halides and sulfonyl lactams. Other suitable donor substances include thiourea, dithiobiuret, guanidine, aminothiazine, aminothiols, aminoalkyl phenols and other polyfunctional phenols and thiols. The most satisfactory products are prepared when one of the reactant substances is an organic compound of low molecular weight having at least two reactive radicals (like or unlike) selected from among the following: amino and amidino—NHR, where R is H or alkyl; phenolic —OH; and —SH; and when the other reacting substance is an organic compound of low molecular weight capable of reacting at room temperature with ethanol to form a compound having at least two ester groups.

Filaments may be formed by extruding or jetting one of the reacting phases into the other, as is described in the above patent applications. The extruded phase may be called "spinning solution," while the phase receiving it may be called "bath," both terms arising from an extension of terminology applied to existing processes for the manufacture of synthetic fibers. Polymer forms at the interface between the extruded solution and the reactant bath as a tube-like filament surrounding a core composed at least partly of spinning solution. Depending upon the materials used in forming the filament and upon its subsequent processing, the filament may collapse, or not, with or without coalescence of the inner surfaces of the tube.

The present invention is directed toward improving product quality by reducing the fluidity of the extruded spinning solution. It is surprising to find that solutions requiring greater extruding force are conducive to improved continuity and evenness of product formation. Accordingly, it is a primary object of this invention to increase the viscosity of solution extruded for direct preparation of shaped articles by interfacial polymerization. Other objects will be apparent from the following description of the invention.

In general the objects of this invention are attainable by adding to spinning solution to be employed in the described technique of interfacial polymerization what may be called a "thickening agent" or simply "thickener" to increase the viscosity (reduce the fluidity) of that solution. Of course, the thickener should be inert toward reactants present in the phase to which it is added, and it should also be relatively unreactive, if not completely inert, with respect to reactants present in the other phase. Not all thickening agents that may be useful in the practice of this invention can be expected to prove suitable for addition to either phase. The chemical and physical properties of any particular thickener, considered in relation to the properties of the reactants and of whatever solvents or other substances may be used, largely determine which of the phases may receive the thickener satisfactorily and, hence, which reactant phase ought to be extruded into the other.

For satisfactory results, sufficient thickener should be present in the phase to be extruded to increase the viscosity appreciably above that exhibited by the reactant in an ordinary organic solvent (e.g., benzene), which usually is on the order of one centipoise. A tenfold increase is considered "appreciable" for the purpose of this invention, and the resulting viscosity should be at least five centipoises, preferably not less than about ten centipoises. The upper limit of viscosity depends largely upon the factors generally considered in the handling of viscous materials, such as the strength of the confining containers, other requirements of equipment adapted to produce the desired results, and properties of the bath phase. Usually no advantage may be gained by exceeding a viscosity of about ten thousand centipoises, and seldom need five thousand centipoises be exceeded. The bath phase may be thickened, or not; the present invention resides in the thickening of the phase to be extruded. Where an acid chloride is extruded into contact with a diamine, the bath usually is aqueous and its viscosity is consequently much less than that of the thickened spinning solution.

Thickeners useful according to this invention include naturally viscous liquids, such as substances of high molecular weight, low-melting solids fluid at the prevailing conditions, and anisotropic media. Increased viscosity may be obtained owing to properties, whether chemical or physical, apparent only after addition of the thickener to the phase to be extruded. The thickened medium, although conveniently referred to as a "phase" or "solution," may be heterogeneous, as where a thickener or other substance is dispersed in it. Of course, occasionally a thickener may serve also as solvent for a reactant. Materials useful as thickeners include natural and synthetic rubbers, hydrocarbons of high molecular weight and halogenated derivatives thereof, synthetic and natural proteins, cellulose derivatives, polysaccharides, polyethers, polyamides, polyesters, and vinyl polymers, among others.

For convenience, the invention is exemplified below by description of production of polyamide yarns; the examples illustrate the practice of the invention with readily available materials. Parts are given by weight.

*Example I*

A spinning solution is made up containing 87.7 parts carbon tetrachloride, 2.3 parts polyisobutylene ("Vistanex" B–100–XC), and 10.0 parts sebacyl chloride. The solution viscosity is 220 centipoises, compared to one centipoise for the unthickened solution. The solution is spun through a tantalum spinneret having eight holes of 0.005" diameter into a bath containing 83 parts water, 10 parts hexamethylenediamine, and 7 parts sodium hydroxide. The spinning solution jets smoothly and evenly into the spinning bath and produces filaments of much improved denier uniformity over those obtained without the use of the thickener. The fibers are wound up at 30 yards per minute (y.p.m.) on a hollow perforated roll in a container of methanol. The material referred to in this example as "Vistanex" (obtainable from Standard Oil Company of New Jersey) is a mixture of compounds formed by low-temperature polymerization of isobutylene, the resulting polymers being completely saturated, resistant to oxidation, and generally soluble in hydrocarbon solvents and oils.

The spinning cell used in the above example was a cylinder constructed from a nickel pipe containing a nickel piston with rings made from tetrafluoroethylene resin. The spinning solution was placed in the lower part of the cell, the piston inserted, and the remaining portion of the cell filled with ordinary hydraulic fluid. The spinning solution was then forced out by metering the hydraulic fluid at the desired rate into the upper portion of this closed system. The spinneret assembly included a polyethylene gasket, five layers of fabric made from polyacrylonitrile fiber, another polyethylene gasket, and a tantalum spinneret of the conventional hat-shaped viscose type, ½" in diameter. Bath solution was circulated in a stainless steel tray about 4 feet long by means of a circulating pump, which withdrew solution from the far end of the tank and returned it through a gravity filter to the spinneret end of the bath. The filaments were withdrawn by means of a driven-roll, idler-roll combination and were wound up at constant speed on a perforated tube adapted to transmit a flow of washing fluid. Other examples in which this apparatus was used follow.

*Example II*

Except as noted, this example is like Example I. The spinning solution contains a smaller concentration of polyisobutylene, namely, 0.7 part, and a cross-linking agent, tricarballylyl chloride, is present in the amount of 0.05 part. This spinning solution has a viscosity of 50 centipoises. The filaments are withdrawn at a speed of 17 y.p.m. and passed to a second roll running at 34 y.p.m. to effect a drawing of 2× on the run. Again the jetting is excellent and the yarns extremely uniform in denier. In this example a filter pack is employed behind the spinneret, and the extrusion pressure is approximately 400 pounds per square inch (p.s.i.).

*Example III*

Following the procedure of the above examples, a spinning solution composed of 60 parts "Aroclor" 1254, 30 parts "Aroclor" 1248, and 10 parts sebacyl chloride is spun through an 8-hole tantalum spinneret into a solution composed of 83 parts of water, 10 parts hexamethylenediamine, and 7 parts sodium hydroxide. The spinning pressure is approximately 500 p.s.i. The filaments thus formed are wound up at 70 y.p.m. in acetone and found to be extremely uniform in denier.

The thickeners referred to as "Aroclor" in Example III are mixtures of chlorinated biphenyl isomers (obtainable from Monsanto Chemical Company). The additional ingredients of Examples II, V, and XI provided a desired amount of cross-linking to confer properties of insolubility and infusibility upon the product. Use of such ingredients is described in the Houtz patent application mentioned above.

*Example IV*

A spinning solution is made up of 90 parts "Aroclor" 1248 and 10 parts of sebacyl chloride. The bath and general procedure are as described in Example I. The spinning solution is spun through a tantalum spinneret containing 25 holes, each 0.003 inch in diameter, run through a rinsing bath of acetone, and then wound up at 20 y.p.m. in a washing bath of alcohol. After thorough washing to extract the thickener from the interior, the yarn is immersed in boiling water. The resulting yarn is white, soft, and flexible, with filaments of extremely uniform denier. The inherent viscosity of this product is 1.2 in m-cresol. The filaments after processing as described are collapsed tubes having ribbon-shaped cross-sections approximately 5 microns thick and 60 microns wide. After drawing 2.4× at 150° C., the yarn shows a tenacity of 2.8 grams per denier (g.p.d.) at an elongation of 20%.

*Example V*

Following the procedures of Example I, a spinning solution containing 5 parts hexamethylenediamine, 3 parts 3,3'-iminobispropylamine, 6 parts polyvinyl alcohol, and 86 parts water is spun through a 20-hole tantalum spinneret into a spinning bath made up of 10 parts adipyl chloride and 90 parts chlorobenzene. The spinning solution jets evenly and steadily through the spinneret, which has orifices 0.003 inch in diameter. Resulting 850 denier yarn is wound up and drawn 2× to give a strength of 1 gram per denier.

*Example VI*

A spinning solution composed of 90 parts chlorobenzene, 10 parts adipyl chloride and 10 parts vinyl acetate/crotonic acid copolymer (95/5), the solution having a viscosity of 41 centipoises, is spun into a bath containing 6 parts hexamethylenediamine, 4 parts 3,3'-iminobispropylamine and 90 parts water through a tantalum spinneret containing 20 holes of 0.003 inch diameter. The yarn is withdrawn from the bath at 57.7 y.p.m., wet-stretched, 1.34×, and wound up at 77.4 y.p.m. The yarn produced is extremely uniform in denier, resulting from the smooth jetting of the viscous spinning solution into the bath.

The spinning equipment employed in Example VI included an upper bath tank (in which the spinneret was immersed) connected to a lower tank (approximately 3 inches lower) by a half-inch glass tube 30 inches long to serve as a cocurrent spinning tube. An outlet from the lower tank ran to a circulating pump which could return the bath fluid to the upper bath tank through either a heat exchanger adapted to provide elevated temperatures or a refrigeration system for subnormal temperatures. The fluid comprising the bath flowed by gravity through the cocurrent tube, the rate of flow being determined principally by the height of the fluid in the upper tank.

The spinning pump, which was especially designed to meter corrosive fluid at a constant rate over a wide range of pressures, comprised four pistons operated by cams to give similarly peaked flow patterns for both intake and discharge strokes. Continuous non-pulsating intake and discharge flow was obtained by phasing the cams for the sequence of pistons ninety degrees apart. Screwing of intake and discharge valve assemblies into the cylinder block facilitated replacement, as might be required. The intake and discharge manifolds were short drilled members clamped onto the valve assemblies over polytetrafluoroethylene gaskets to permit operation of two sets of the valves in series for exceptionally high pressures.

This pump was used to withdraw the spinning solution from a reservoir and extrude it through a multihole spinneret. The yarn was withdrawn from the bath by making one turn about a hollow perforated resin-coated roll and thence collected on a similar roll rotating in a bath of washing fluid. The windup roll was capable of being operated at a faster surface speed than the withdrawing roll in order to wet-stretch the as-spun yarn, if desired.

Additional examples of the invention employing the equipment utilized in Example VI appear below.

Example VII

With the equipment and the procedures described in Example VI, a spinning solution having a viscosity of 44 centipoises and containing 86 parts monochlorobenzene, 10 parts adipyl chloride, and 4 parts polyisobutylene ("Vistanex-80") was extruded through a tantalum spinneret having 20 orifices 0.003 inch in diameter into the bath described in Example I. The wound-up filaments are extremely uniform in denier as a result of the uniform jetting of the spinning solution.

Example VIII

A spinning solution composed of 16.8 parts of ethylene/vinyl acetate copolymer (75/25), 68.2 parts toluene, and 15 parts adipyl chloride is employed in the procedure and apparatus described in Example VI to produce a 20-filament yarn exhibiting a high degree of denier uniformity.

Example IX

Using the equipment and procedures described in Example VI, a spinning solution containing 10 parts adipyl chloride, 0.27 part of an "Alfin" rubber, and 89.73 parts monochlorobenzene is spun into the bath composition of that example through a tantalum spinneret containing 20 holes of 0.007 inch diameter. This "Alfin" rubber is a polybutadiene that gives an inherent viscosity of 14.6 in this solvent; the spinning viscosity is about 50 centipoises. The yarn is withdrawn from the bath at 14.6 y.p.m. and wound up at 19.6 y.p.m. after passing through methanol as a washing medium. An extremely uniform 214-denier yarn is produced, which in the undrawn state possesses a tenacity of 0.4 g.p.d. at an elongation of 253%. After drawing 4.3× at 150° C., the yarn has a denier of 62 and a tenacity of 1.9 g.p.d. at an elongation of 25%.

When the procedure of this last example was carried out without the use of the "Alfin" rubber in the spinning solution, the yarn was not nearly as uniform in denier, nor nearly as strong; the best tenacity that could be obtained in the drawn yarn was 0.7 g.p.d. at an elongation of 27%.

The "Alfin" rubber used in the immediately preceding and immediately following examples was prepared by polymerization of butadiene in the presence of an "Alfin" catalyst, as described by Morton et al. Ind. Eng. Chem. 44, 2876 (1952). An amyl-sodium derivative was used as catalyst, prepared according to the following method in an atmosphere of nitrogen: (1) Sodium sand (23 g.) was prepared by heating sodium in decane until slightly above its melting point (120–150° C.) and stirring with a high speed stirrer for almost two minutes; the mixture was then allowed to cool slowly without stirring. (2) The decane was removed by siphoning (or was forced off with nitrogen); a small amount of pentane was used as a chaser, and pentane was then added as the solvent for subsequent steps. (3) 0.5 mole of n-amyl chloride was added through a dropping funnel over a period of one hour while the reaction mixture was maintained at −10° C.; the mixture was then allowed to warm to 25° C., and stirring was continued for one hour more (with exercise of caution to prevent the pressure of the pentane mixture from exceeding the nitrogen pressure and forcing the liquid from the pot, which would lead to danger of fire). (4) The mixture was cooled to 0° C., and 0.34 mole of isopropyl alcohol was added dropwise over a period of ten minutes. (5) Propylene was bubbled through the mixture for an hour while the temperature was maintained at 0° C., then the mixture was allowed to warm to room temperature, and propylene was bubbled through for approximately another hour.

The preparation of "Alfin" rubber was carried out in pentane which had been dried over amyl-sodium prepared as stated above. Thirty cc. of butadiene was added to 200 cc. of pentane in a clean soft-drink bottle. Three to five cc. of the catalyst were added and the bottle was capped. The mixture was shaken lightly and immersed in tap water when it began to react exothermically. The mixture solidified, and after several hours the bottles were uncapped and broken. The rubber was immediately immersed in benzene containing approximately 0.5 g. of di-tert-butyl hydroquinone. While still immersed in benzene the rubber was cut into small pieces to aid solution. Several batches of "Alfin" rubber solution were prepared and shaken or rolled on rubber rolls for about a week. The solutions were then filtered through cheese cloth to remove undissolved rubber.

Example X

By the equipment and procedure described in Example VI, a spinning solution containing 10 parts sebacyl chloride, 0.15 part "Alfin" rubber, and 89.85 parts monochlorobenzene is spun into a bath containing 10 parts hexamethylenediamine, 10 parts sodium hydroxide, and 80 parts water. The 9 cp. solution jets through a tantalum spinneret having 20 holes of 0.007 inch diameter at 18.9 y.p.m. The yarn is removed from the bath at 9.5 y.p.m. and wound up at 12.2 y.p.m., with a methanol wash at the windup. The spinning is extremely even and steady, producing a fully uniform yarn having an intrinsic viscosity in m-cresol of 1.3. After drawing 4.2× at 150° C., the yarn has a tenacity of 3.0 g.p.d. at 30% elongation.

Under conditions identical with those of Example X except that the "Alfin" rubber was left out of the spinning solution, a yarn was obtained with an inherent viscosity of 1.38. However, because of non-uniformities, the yarn could be drawn only 3.95×, and the best tenacity that could be obtained was 1.8 g.p.d., at 33% elongation.

Example XI

With the equipment and procedure described in Example VI, a spinning solution containing 10 parts adipyl chloride, 0.25 part polymethylmethacrylate (average molecular weight approximately 4 million) and 90 parts alcohol-free chloroform is spun into a bath containing 6 parts hexamethylenediamine, 4 parts 3,3'-iminobispropylamine, and 90 parts water. The solution, which has a viscosity of 22 centipoises, jets smoothly and evenly through a tantalum spinneret having 20 holes of 0.007 inch diameter. The yarn is removed from the bath at 55 y.p.m. and wound up at 58 y.p.m. using a methanol wash. The spinning is quite steady, producing an undrawn yarn having a uniform denier of 32, a tenacity of 0.47 g.p.d. at 140% elongation. After drawing 3× at 80° C. the yarn exhibits a tenacity of 1.1 g.p.d. at 20% elongation.

Each of the products obtained according to any of the above examples exhibits remarkable uniformity throughout, a marked contrast to that produced in the absence of an appropriate thickener. Too, fewer breaks and other spinning interruptions occur when a thickener is used. The filaments may be drawn over a wide range of temperatures in the usual manner to give tenacities greater than those obtained by similar drawing of filaments similarly produced from the same reactants in the absence of thickener. Presence of residual thickener may deluster the filaments or alter the handle of fabrics made from them.

The products of Examples IX and X possess cores composed of the "Alfin" rubber used as a thickener, as the washing medium was chosen to be a solvent for the excess acid chloride without being a solvent for the rubber. In this way it is possible to prepare structures with different cores and thereby modify the properties of the final product. As illustrated in Example IV, filaments can be made in a collapsed ribbon-like configuration by dissolving out the thickener from the core and then drawing or winding under sufficient tension to cause the hollow filamentary tube to collapse. In other instances the inner surfaces of the collapsed tube can be coalesced to form a more wiry filament. In still other instances, where the polymeric material forming the filament sheath has high stiffness and resistance to deformation, uncollapsed hollow filaments can be made by washing the spun structures with a poor solvent or non-solvent for the thickener in the core, drawing the filaments to increased length with the cores in place and subsequently dissolving out the cores with an effective solvent for the thickener. Other after-treatments may be employed to enhance the benefits of the present invention in the production of filamentary or other shaped articles.

Figure 2:
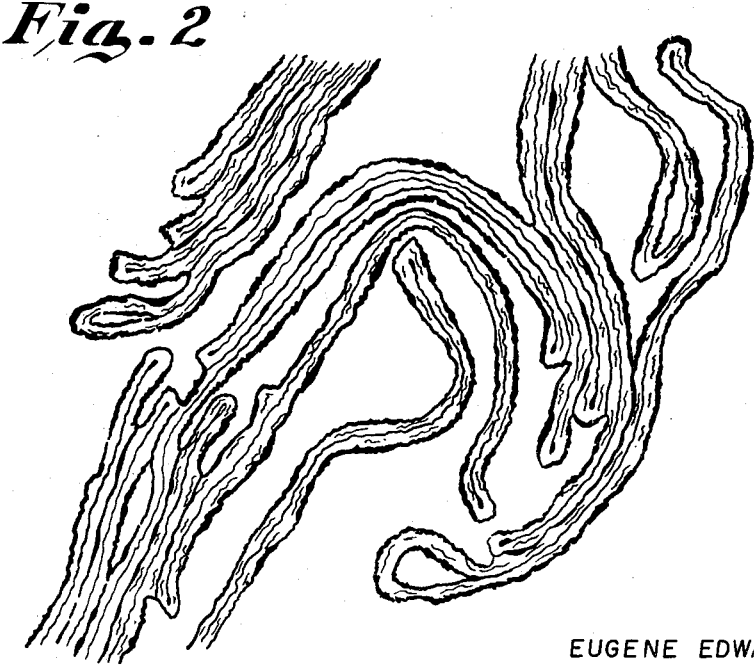

Figure 1 represents a highly magnified cross-section of the filaments prepared by the process of this invention. The filaments have the structure of collapsed tubes, bearing on their inner surfaces polymeric material plus residual thickening agent. The exact location of the thickening agent within the filaments is not completely known. However, in the cross-sections which are reproduced from photomicrographs, numeral 1 indicates the polymeric skin formed by reaction between the acid chloride and the diamine. Numeral 2 represents the inner surface of the collapsed tube-like filament, and probably contains some proportion of the thickening agent as well as the polyamide. A major portion of the thickening agent remaining within the filament appears to be located in the loops which form the ends of the filament cross-sections, indicated as 3. When the thickening agent has been extracted from the filaments as described herein, void spaces are observed, as is shown in Figure 2, which represents cross-sections of extracted filaments at the same magnification.

What is claimed:

1. In a process of forming a self-supporting polymeric article at an interface of controlled shape between coacting reactant phases wherein a condensation polymer is formed by extruding a stream of one reactant phase into a bath of other reactant phase, the improvement comprising adding to the phase to be extruded a relatively unreactive thickening agent effective to increase the viscosity of that phase appreciably above the original viscosity.

2. In a process of forming a self-supporting polymeric article at an interface of controlled shape between coacting reactant phases wherein a condensation polymer is formed by extruding a stream of one reactant phase into a bath of other reactant phase, the improvement comprising adding to the phase to be extruded a relatively unreactive thickening agent effective to increase the viscosity of that phase to at least five centipoises.

3. Process of forming a polymeric filament at an interface between coacting reactant phases, ingredients of the respective phases being capable of reacting with one another at an interface therebetween to form a condensation polymer, comprising extruding a fine stream of one reactant phase whose viscosity has been increased to at least ten centipoises, by addition of a thickening agent incapable of reacting appreciably with any of the ingredients of the reactant phases, into a bath of another reactant phase and then withdrawing the filament as it forms.

4. The process of claim 3 in which the thickening agent is a polymeric substance of high molecular weight.

5. The process of claim 3 in which the thickening agent is a viscous fluid under the extrusion conditions.

6. The process of claim 4 in which the thickening agent is a synthetic rubber.

7. The process of claim 4 in which the thickening agent is a polyisobutylene.

8. The process of claim 4 in which the thickening agent is a vinyl polymer.

9. The process of claim 5 in which the thickening agent is a mixture of chlorinated biphenyl isomers.

10. A process of forming a hollow polymeric filament at an interface between coacting reactant phases, ingredients of the respective phases being capable of reacting with one another at an interface therebetween to form a condensation polymer, comprising extruding a fine stream of one reactant phase whose viscosity has been increased to about 10 centipoises, by addition of a thickening agent incapable of reacting appreciably with any of the ingredients of the reactant phases, into a bath of another reactant phase, withdrawing the filament as it forms and washing the filament with a solvent effective to remove residual thickener from the core of the filament.

References Cited in the file of this patent

UNITED STATES PATENTS

| | | |
|---|---|---|
| 1,713,679 | Snelling | May 21, 1929 |
| 1,864,426 | Gardner | June 21, 1932 |
| 2,072,102 | Dreyfus et al. | Mar. 2, 1937 |
| 2,138,751 | Vohrer | Nov. 29, 1938 |
| 2,428,046 | Sisson et al. | Sept. 30, 1947 |
| 2,439,814 | Sisson | Apr. 20, 1948 |
| 2,443,711 | Sisson | June 22, 1948 |
| 2,604,667 | Hebeler | July 29, 1952 |
| 2,708,617 | Magat et al. | May 17, 1955 |
| 2,718,452 | Lontz | Sept. 20, 1955 |
| 2,795,821 | Williams | June 18, 1957 |